(12) United States Patent
Grimme

(10) Patent No.: US 6,559,425 B2
(45) Date of Patent: May 6, 2003

(54) METHOD AND A DEVICE FOR THE THERMAL TREATMENT OF FRICTION LINING SURFACES

(75) Inventor: Hansjörg Grimme, Glinde (DE)

(73) Assignee: AlliedSignal Bremsbelag GmbH, Glinde (DE)

( * ) Notice: Subject to any disclaimer, the term of this patent is extended or adjusted under 35 U.S.C. 154(b) by 0 days.

(21) Appl. No.: 09/945,335

(22) Filed: Aug. 31, 2001

(65) Prior Publication Data

US 2002/0046789 A1 Apr. 25, 2002

(51) Int. Cl.[7] .................................................. F27B 9/36
(52) U.S. Cl. ........................................ 219/411; 219/388
(58) Field of Search ................................. 219/388, 411; 428/66.2

(56) References Cited

U.S. PATENT DOCUMENTS

| | | | | |
|---|---|---|---|---|
| 3,867,093 A | * | 2/1975 | Huttermann | 432/125 |
| 3,972,127 A | * | 8/1976 | Hoshi et al. | 34/266 |
| 4,081,307 A | * | 3/1978 | Morgan, Jr. | 156/273.3 |
| 4,460,821 A | * | 7/1984 | Crain et al. | 219/388 |
| 4,554,437 A | * | 11/1985 | Wagner et al. | 219/388 |
| 4,894,517 A | * | 1/1990 | Oguri | 219/388 |
| 5,770,835 A | * | 6/1998 | Sakuyama et al. | 219/388 |
| 5,864,119 A | * | 1/1999 | Vogt et al. | 219/388 |
| 5,907,995 A | * | 6/1999 | Zimmer et al. | 100/38 |
| 6,064,040 A | * | 5/2000 | Muller et al. | 219/388 |

* cited by examiner

Primary Examiner—Joseph Pelham
(74) Attorney, Agent, or Firm—Friedrich Kueffner

(57) ABSTRACT

A device (100) for the thermal treatment of friction lining surfaces (19) (scorching) is characterized in that at least one infrared light source is placed in the heating station (10) for heating the friction lining surfaces. Short-wave infrared light of approximately 780 to 1400 nm with a maximum at 1200 nm is preferably used. A suction bell (11) and a fan (12) for removing the decomposition gas are above the heating station (10). The irradiation can take place in depression or in special chemical atmospheres. An infrared thermometer (20) supervises the temperature of the friction lining surfaces (19) and eventually causes an elimination (14) of parts. A cooling station (17) is following the heating station (10).

7 Claims, 1 Drawing Sheet

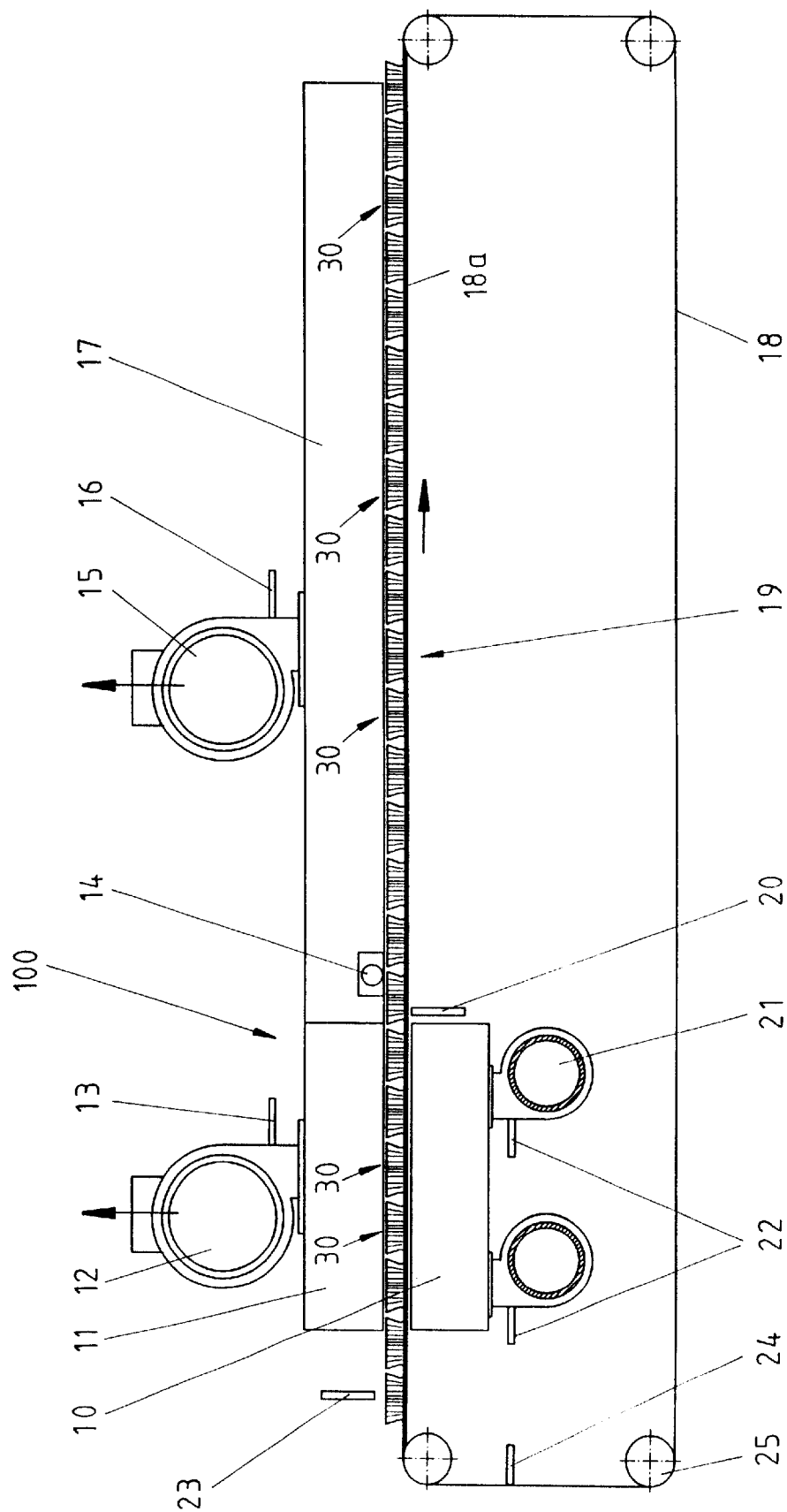

METHOD AND A DEVICE FOR THE THERMAL TREATMENT OF FRICTION LINING SURFACES

BACKGROUND OF THE INVENTION

1. Field of the Invention

This invention relates to a method for the thermal treatment all friction lining surfaces, the friction lining surface being brought for a limited. To an elevated temperature. Moreover, the invention relates to the device for the thermal treatment off friction lining surfaces with a heating station for heating the friction lining surfaces.

2. Description of Related Art

A method and a device of the type mentioned above are known from EP 0 799 391 B1. They are useful for the treatment of surfaces of friction linings which are used especially in brakes of vehicles. Such friction lining surfaces generally contain organic binding agents. In order to prevent a so-called greenfading by the first use of a brake with a corresponding heat evolution, the friction lining surfaces are subject before fitting to a thermal treatment, the so-called scorching.

A known type of scorching consists in the treatment of the friction lining surface with a gas flame. However, the strong dependence of the temperature on the friction lining surface on the gas flame, especially on the composition of the used burnable gas and on the oxygen supply during the burning process, is disadvantageous. A too hot flame can result in melting the anorganic constituents or the metals in the friction lining surface; on the contrary, a cold flame can result in very long treatment periods or in the fouling of the friction lining surface.

Furthermore, according to the prior art, a scorching ensues by laying on or pressing a hot plate. Hereby, it can however come to a sealing of the friction lining surface during the contact with the hot plate. Moreover, the temperature of the hot plate can be maintained constant over the whole surface only with difficulty, and the bad heat conduction of the temperature stable high-alloy steels which are usually used has a negative effect on the heat transmission.

In the above mentioned EP 0 799 391 B1, the scorching also ensues by laying on a hot plate. In order to avoid a part of the problems related hereto such as especially the sealing of the friction lining surface and the nonuniform temperature distribution and to allow a timed operation, it is proposed to use several heating stations arranged the one behind the other in which the heating takes place stepwise. This method means high investment costs and high operating expenses. Moreover, the problem of a nonuniform heating of the surface basically remains and gas which originates at the time of the pressing-on cannot escape from the surface.

SUMMARY OF THE INVENTION

The aim of the invention is to improve a method and a device of the above mentioned type in such a way that this simple automatizable thermal treatment (scorching) of friction lining surfaces is possible at low cost and with a high-quality result.

This aim is achieved by a method according to which the increase in temperature of the friction lining surface takes place by infrared light irradiation and by a device having at least one infrared light source placed in the heating station.

Accordingly, the method for which the friction lining surface is brought to an elevated temperature for a limited period in a known manner is characterized in that the increase of temperature takes place with an infrared light irradiation. Various important advantages can thus be obtained. On the one hand, the heat supply can be exactly controlled. Thus, the friction lining surface can be heated very uniformly and very exactly to the desired temperature. On the other hand, no parts have to be in contact with the friction lining surface. The gas eventually developing on the friction lining surface because of the heating can thus freely escape from the surface and do not cause any damages. The medium surrounding the friction lining surface can also be freely chosen so that for example atmospheres with a certain effect can be adjusted to the friction lining surface. Not least the use of infrared light also causes lower investment and operating expenses. The minor susceptance to failure, the automatizability of the method as well as the energy saving also contribute to reduce the operating expenses, since due to the infrared light the heat energy can be brought exactly and without high losses to its place of activity. Reduced investment costs result from a mechanical assembly which is considerably simplified.

The infrared light used advantageously has a wavelength of 780 to 1400 nm, the maximum of intensity being preferably at 1200 nm. Thus it is preferably short-wave infrared radiation. The advantage of the short-wave infrared radiation is that this radiation transports the heat energy very efficiently and without a medium. The heating of the friction lining surface can thus also take place under depression and the removal of the decomposition products from the anorganic constituents of the friction linings which arise during scorching can be carried out with strong suction devices without impairing the heat transport of the infrared light sources to the friction lining surface. A further advantage of the short-wave infrared radiation is that the infrared radiators used for this purpose have a very short reaction time of 1 to 3 s so that the scorching installation does not have to be continuously working and must only be switched-on on demand, i.e. for the actual scorching process in order to obtain the temperature necessary for the work cycle.

The friction lining surface can be irradiated with an infrared light power density of 150 to 800 kW/m$^2$. For these values, the friction lining surface is heated quickly. However this takes place without coming to damages because of local overheating or without the heat being distributed nonuniformly on the surface.

The increase of temperature takes place preferably up to a temperature of 600 to 900° C. in order to guarantee an optimal scorching.

The irradiation of a friction lining surface advantageously takes place for a period of 5 to 40 s, preferably for 25 to 35 s. Such values guarantee on the one hand a gut result of treatment, on the other hand the treatment is carried out quickly and thus allows an automatized production. Hereby, attention must be paid to the fact that for example in comparison with EP 0 799 391 B1 basically only an unique heating step is necessary. In case it is desirable for some reason, a multistage heating could naturally also take place by correspondingly driving or arranging the infrared light sources.

The friction lining surface can be transported during the irradiation along the infrared light source what preferably takes place at a speed of 1,0 to 2,0 m/min. The production process can thus take place continuously and with a known speed, and the infrared light sources do not have to be continuously alternately switched on and off. Moreover, a thermal treatment during the transport has the advantage that eventual non-homogeneities in the radiation field of the infrared light sources are compensated, since the friction lining surface is moved in the radiation field.

The friction lining surface is preferably cooled down after irradiation. Thus, among other things, the quick further processability of the friction linings is made possible.

In a further development of the method, the thermal treatment is carried out in an inert oxidizing reducing or in a depression atmosphere. Desired properties of the friction lining surface can thus be specifically influenced. The selection of the atmosphere can take place entirely with respect to the desired result, since the infrared light irradiation hardly imposes restrictions with respect to the usable atmosphere types. According to the prior art, a supporting use of such atmosphere types was not possible, neither during heating with flames, nor with hot plates.

The temperature of the friction lining surface will be measured and the treatment process will be controlled in dependence hereupon. Since the friction lining surface is always freely accessible during the thermal treatment—differently from the prior art—a temperature measurement can always take place. Therefore, the observance of the required scorching conditions can be exactly supervised. In case of a deviation from the nominal values, an interference with the treatment process can take place, for example over the variation of the infrared light sources power, over the transport or the sorting out of the friction linings. The arising of production waste is also minimized hereby.

In a further development of the process control, at least one of the following measures and preferably all following measures must be operative for the operation of the infrared light source:
a) suction of the waste gas in the treatment room,
b) cooling down of the friction lining surface after the thermal treatment,
c) cooling down of the infrared light source,
d) transport of the friction lining surfaces,
e) process monitoring sensors, especially temperature sensors for the friction lining surfaces.

The supervision of said conditions ensures that the heat emission does not take place in a situation in which it could result in dangerous and harmful effects, for example during a jamming of the conveying belt.

Moreover, the invention relates to a device for the thermal treatment of friction lining surfaces which shows in a known way a heating station for heating the friction lining surfaces. According to the invention, the device is characterized in that at least one infrared light source is placed in the heating station.

Such a device causes, in comparison with the installations known by the prior art, reduced investment costs, since it has a substantially simplified mechanical structure. Moreover, the method described above and its advantages can be achieved with such a device. Hereby, because of the good controllability of the heat supply, the friction lining surface can be heated very uniformly and very exactly to the desired temperature. On the other hand, no parts of the device have to come into contact with the friction lining surface, what reduces sources of errors and what extends the treatment options (for example adjustment of certain atmospheres, temperature supervision).

A conveying device for the friction linings is preferably guided through the heating station. Therefore, the device can be simply integrated into a production process by being mounted for example around a conveyling belt. Moreover, the thermal treatment during the transport of the friction linings has the advantage consisting in that eventual non-homogeneities of the radiation field are compensated and that a control of the irradiation duration can take place over the conveying speed.

A cooling station is preferably placed following the heating station. The indication "following" is to be understood here and below with reference to the production depending transport direction of the friction linings. A cooling station supports the thermal treatment and makes possible the quick further treatment of the friction linings because of their accelerated cooling down.

The heating station and/or the cooling station show a suction device. Decomposition products which eventually arise during the thermal treatment can be efficiently removed by this device and be fed to an appropriate disposal installation.

A temperature sensor can be placed following the heating station, this temperature sensor being preferably connected with the control of the infrared light sources. The observance of the desired surface temperatures of the friction linings can be supervised by this sensor. It can be quickly be reacted to a deviation, especially by increasing or reducing the power of the infrared light sources in order to guarantee correct results again for the succeeding friction linings.

An eliminating device for defective friction linings can be placed following the heating station. This eliminating device is preferably coupled with said temperature supervision so that insufficiently treated friction linings can be immediately sorted out. The characteristic "defective" is to be understood as a broad concept and also includes deviations from a nominal status which do not necessarily cause the uselessness of the friction lining.

Moreover, an object detection device can be placed in front of the heating station, detection device with which the entering of friction linings into the heating station can be detected and which is preferably connected with the control of the infrared light sources. If a bigger distance appears between the friction linings, the infrared light sources can be switched off for sparing the installation and for saving energy.

BRIEF DESCRIPTION OF THE DRAWINGS

The invention will be explained as an example below with reference to FIG. 1.

FIG. 1 schematically shows the structure of a device according to the invention for the thermal treatment of friction mining surfaces (scorching)

DESCRIPTION OF THE PREFERRED EMBODIMENTS

The device 100 is placed around a conveying belt 18 which is guided by four deflection rollers 25 circulating endless in direction of the arrow and is preferably designed as a bar plaited conveying belt made of temperature stable steel. Friction linings 30 with the friction lining surface 19 to be thermally treated orientated downwards are at a distance as close as possible on the upper (forward) backing side 18a of the conveying belt 18. The further structure of the device 100 will be described below with reference to the direction of circulation (arrow) of the conveying belt 18.

A sensor 23 for the object detection is to be found at the entrance of the device 100. With this sensor, it can be determined if a friction lining lies on the conveying belt 18.

The thermal treatment begins behind the sensor 23 in a section of the device which consists of the heating station 10 placed under the conveying belt 18 and of the suction bell 11 placed opposite over the conveying belt. The heatable length of the heating station 10 is typically approximately 600 mm for a heatable width of 280 mm. Infrared radiators which can deliver their radiation upwards in direction of the conveying belt 18 or of the friction lining surfaces are placed in the heating station 10. Typically 5 to 40 radiators with a power of respectively 3000 W for an operating voltage of 230 V are used here. The distance of the radiators from the conveying belt 18 can preferably be adjusted, a distance of approximately 40 mm being preset. The number of the radiators can also be reduced by a corresponding circuit or another assembly, if the process allows for it.

The connections of the infrared radiators are cooled in the heating station 10 over the two ventilators 21. The temperature of the cooling air is supervised by the temperature sensors 22.

Decomposition products from the friction lining surface 19 are collected during the irradiation in the suction bell 11 and are removed by the fan 12 in the cover of the suction bell. The fan 12 lifts typically with a speed of 7 to 10 m/s for a volume flow of 1000 m³/h. The drawing-off air is supervised by a sensor 13.

An infrared sensor 20 is placed following the heating station 10 under the conveying belt 18, this infrared sensor detecting the temperature of the friction lining surface 19. It can be connected with a compressed air supply for cooling. Furthermore, it can be preferably connected with the control of a pneumatic cylinder 14 which is placed above the conveying belt 18 and with which defective friction linings can be sorted out.

The infrared sensor 20 and the pneumatic cylinder 14 are in a cooling tunnel 17 which directly follows the heating station 10 or the suction bell 11 and which surrounds the conveying belt 18. A cooling ventilator 15 is placed approximately in the middle of the cover of the cooling tunnel 17, whereby this cooling ventilator is able to lift cooling air with a speed of approximately 18 to 22 m/s for a volume flow of approximately 1000 m³/h. The cooling air is supervised by a sensor 16 at the entrance of the ventilator.

The operation of the device 100 is preferably carried out as follows.

The parts to be scorched are laid with the friction lining surface 19 turned downwards onto the feeding belt 18 or are delivered in the corresponding position by a preceding installation such as for example a grinding machine.

The first part to be scorched is detected in front of the infrared heating station 10 by the sensor 23 and the infrared module is switched on. This takes place approximately 2 s before the part is in the irradiation area. The infrared module remains switched on as long as parts are detected by the sensor 23. If no piece goes over the device for longer than 30 s, the infrared radiators are switched off. However, the ventilators 12, 15, 21 and the conveying belt 18 are still working.

The temperature is continuously registered by the infrared thermometer 20 directly following the heating station 10. The process is supervised by the infrared thermometer and the uniformity of the scorching is guaranteed. All parts, the surface temperature of which is not within a preset temperature window of typically 720 to 760° C., are eliminated by the pneumatic cylinder 14.

A different scorching intensity specific to each product can be adjusted especially through the belt speed. For the available dimensions, there results a band speed of 1,2 m/min, a scorching time of 30 s (according to a cycle of 5 s) and a belt speed of 1,8 m/min a scorching time of 20 s (according to a cycle of 3,3 s). The cycle says after which time a respectively ready treated friction lining is at the end of the installation. For the treatment of friction linings with outer dimensions of approximately 200×100 mm, six parts at the most can simultaneously be in the heatable area with a length of 600 mm so that the cycle time amounts to a sixth of the scorching time.

Moreover, a different scorching intensity can be adjusted by the switching on or off of infrared radiators.

Before switching on the device, the fulfilment of the five following conditions will be checked:
1. The exhaust fan 12 for the "scorching gas" in the infrared module must be working.
2. The cooling air ventilators 21 in the infrared module must be working.
3. The cooling air ventilator 15 of the cooling section must be working.
4. The conveying belt 18 must be working (supervised by the sensor 24).
5. The infrared thermometer 20 must be working.

If all five conditions are fulfilled and if a brake lining is detected by the sensor 23 on the run-in section, the infrared radiators will be switched on. In order to keep an overload of the electric power supply as low as possible (it prevails an inrush current fifteen times as high for 50 ms), the radiators are switched on the one after the other over safety switches.

If one of said five conditions above is not fulfilled and/or if one or several radiators fail, the infrared module will be immediately switched off and a fault message will be emitted, the sorting out of the pieces which do not show the predetermined surface temperature will start. A signal will be given to preceding installations not to deliver any new parts to the device 100.

As long as the device runs without failure and as long as parts are detected by the sensor 23, the infrared module remains switched on. If no parts are fed to the device 100 for longer than 30 s, the infrared radiators will be switched off. However, the aggregates mentioned under the five conditions above are still working. Only after approximately 300 s without parts, all aggregates can be switched off. The installation automatically starts working from this "standby" state on, if a signal is switched by the preceding installation in such a way that parts are fed to the device 100 or if the sensor 23 (for example a light barrier) in the run-in section registers a part.

If the installation is cut off (not emergency or main switch), all fans must still work for 300 s and the conveying belt 18 must still run for 60 s before the driving gear is switched off.

REFERENCE NUMERALS

100 Device for thermal treatment
10 Heating station
11 Suction bell
12 Fan
13 Sensor
14 Pneumatic cylinder
15 Cooling air ventilator
16 Sensor
17 Cooling tunnel
18 Conveying belt
18a Upper forward backing side of 18
19 Friction lining surface
20 Infrared thermometer
21 Ventilator
22 Temperature sensor 23 Object detection
24 Sensor
25 Deflection roller
30 Friction linings

What is claimed is:

1. A method for the thermal treatment of a friction lining surface by infrared light of high energy (laser), the method comprising the steps of:

exposing the entire surface area of the friction lining surface to an inert, oxidizing or reducing atmosphere or in a depression atmosphere;

irradiating the friction lining surface with an infrared light source emitting a shortwave infrared light of a wavelength of 780 to 1400 nm, wherein the intensity maximum of the shortwave infrared light is approximately 1200 nm at an infrared light power density of 150 to 800 kW/m$^2$ of the infrared light source for a duration of 5 s to 40 s with a temperature increase of 700° to 900° C.;

transporting the friction lining surface during the step of irradiating past the infrared light source at a speed of 1.0 to 2.0 m/min.

2. The method according to claim 1, wherein the duration is 25 s to 35 s.

3. The method according to claim 1, further comprising the step of measuring a temperature of the friction lining surface and controlling the method based on the temperature of the friction lining surface.

4. The method according to claim 1, wherein the step of irradiating comprises at least one of the measures:

removing by suction waste gas from a treatment room;

cooling down the friction lining surface;

cooling the infrared light source;

providing process monitoring sensors for monitoring the friction lining surface.

5. The method according to claim 4, wherein the process monitoring sensors include a temperature sensor.

6. A device for thermal treatment of a friction lining surface, comprising:

a heating station comprising at least one infrared light source and configured to heat the friction lining surface;

a conveying device configured to transport the friction lining surface through the heating station;

a cooling station downstream of the heating station;

at least one suction device correlated with at least one of the heating station and the cooling station;

a temperature sensor arranged downstream of the heating station;

an elimination device for eliminating defective friction linings;

an object detection sensor arranged upstream of the heating station configured to detect a friction lining surface entering the heating station.

7. The device according to claim 6, wherein the infrared light source comprises a control, wherein the temperature sensor is connected to the control and the object detection sensor is connected to the control.

* * * * *